(12) United States Patent
Furumura et al.

(10) Patent No.: US 8,908,055 B2
(45) Date of Patent: Dec. 9, 2014

(54) APPARATUS AND METHOD FOR GENERATING HIGH-DYNAMIC-RANGE (HDR) IMAGES

(71) Applicant: Sony Computer Entertainment Inc., Tokyo (JP)

(72) Inventors: Kyoko Furumura, Tokyo (JP); Shinichi Hirata, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/796,038

(22) Filed: Mar. 12, 2013

(65) Prior Publication Data

US 2013/0229546 A1 Sep. 5, 2013

Related U.S. Application Data

(63) Continuation of application No. PCT/JP2011/004326, filed on Jul. 29, 2011.

(30) Foreign Application Priority Data

Oct. 5, 2010 (JP) ................................. 2010-225366

(51) Int. Cl.
| | | |
|---|---|---|
| H04N 5/225 | (2006.01) | |
| G06T 3/40 | (2006.01) | |
| H04N 5/235 | (2006.01) | |
| H04N 5/232 | (2006.01) | |
| G06T 5/00 | (2006.01) | |
| G06T 5/50 | (2006.01) | |

(52) U.S. Cl.
CPC .... *H04N 5/2355* (2013.01); *G06T 2207/20221* (2013.01); *G06T 2207/10144* (2013.01); *G06T 3/4038* (2013.01); *G06T 2207/20208* (2013.01); *H04N 5/23238* (2013.01); *G06T 2207/10004* (2013.01); *G06T 5/007* (2013.01); *G06T 5/50* (2013.01)
USPC .................... 348/218.1; 348/222.1; 348/362

(58) Field of Classification Search
USPC ...................... 348/208.12, 218.1, 222.1, 362
See application file for complete search history.

(56) References Cited

U.S. PATENT DOCUMENTS 8,340,453 B1 * 12/2012 Chen et al. .................... 382/254
8,483,452 B2 * 7/2013 Ueda et al. ............... 348/208.12

(Continued)

FOREIGN PATENT DOCUMENTS

| JP | 11065004 A | 3/1999 |
|---|---|---|
| JP | 2000347650 A | 12/2000 |

(Continued)

OTHER PUBLICATIONS

Office Action for corresponding Japanese Patent Application No. 2010-225366, Jul. 30, 2013.

(Continued)

*Primary Examiner* — Gevell Selby
(74) *Attorney, Agent, or Firm* — Matthew B. Dernier, Esq.; Gibson & Dernier LLP

(57) ABSTRACT

A low dynamic range (LDR) image data storage stores LDR image sets each of which includes a plurality of LDR segmented images captured with a camera panned. Here each LDR image set is of a different exposure level, respectively. A high-dynamic-range (HDR) synthesizing unit combines and merges a plurality of LDR segmented images of different exposure levels so as to generate an HDR segmented image set including a plurality of HDR segmented images of different pan angles or tilt angles. A panoramic image synthesizing unit generates an HDR panoramic image by stitching together adjacent HDR segmented images.

7 Claims, 11 Drawing Sheets

(56) References Cited

U.S. PATENT DOCUMENTS

| | | |
|---|---|---|
| 2004/0100565 A1 | 5/2004 | Chen |
| 2006/0177150 A1* | 8/2006 | Uyttendaele et al. ......... 348/584 |
| 2009/0022421 A1 | 1/2009 | Uyttendaele |
| 2009/0028462 A1 | 1/2009 | Habuka |

FOREIGN PATENT DOCUMENTS

| | | |
|---|---|---|
| JP | 2009033224 A | 2/2009 |
| JP | 2010074535 A | 4/2010 |

OTHER PUBLICATIONS

International Search Report for the corresponding PCT Application No. PCT/JP2011/004326, dated Oct. 4, 2011.

International Preliminary Report on Patentability and Written Opinion for the corresponding PCT Application No. PCT/JP2011/004326, dated May 8, 2013.

European Search Report for corresponding European Patent Application No. 11830311, Apr. 23, 2014.

* cited by examiner

360

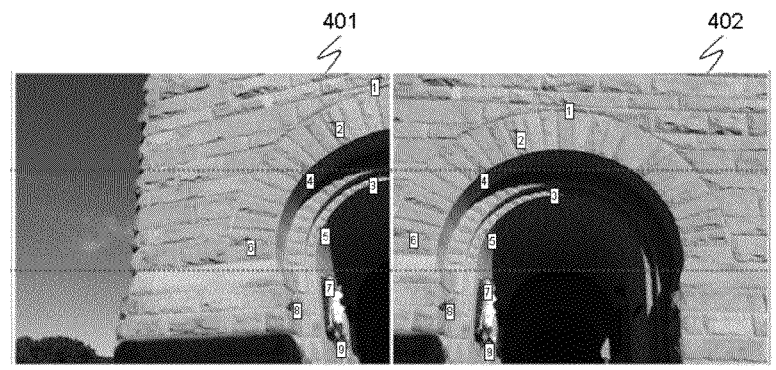
FIG.9A  FIG.9B
FIG.10
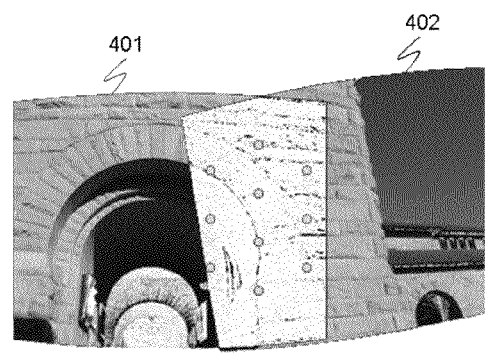
FIG.11A
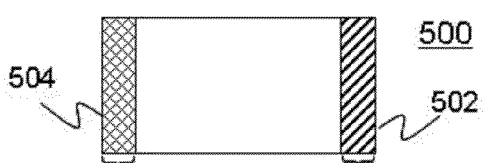
FIG.11B
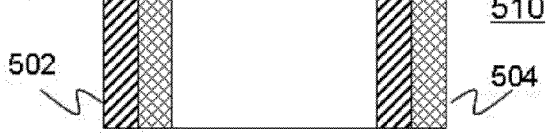

US 8,908,055 B2

APPARATUS AND METHOD FOR GENERATING HIGH-DYNAMIC-RANGE (HDR) IMAGES

BACKGROUND OF THE INVENTION

1. Field of the Invention

The present invention relates to an apparatus and a method for generating images.

2. Description of the Related Art

With the prevalence of digital still cameras and digital video cameras, there are increased occasions where still images or moving images having been shot are stored in a computer for later viewing, processing, or displaying on the screen of a game device or a television system. It is also popularly done that the shot moving images are uploaded to a posting site on the Internet so as to share them with the other users.

Among the digital cameras are those capable of shooting panoramic images, which allow the image taking of panoramic images of wide view angle with perfect ease. Also in wide use are software tools that can generate a panoramic image by stitching together a plurality of images shot by a digital camera from different shooting directions. There is a site named "360cities" (http://www.360cities.net) that accepts the posting of panoramic images shot by users and show them on the Internet, so that the users around the world can view the panoramic images posted.

A panoramic image is a spherical, or omnidirectional, image. When shot outdoors, therefore, it may have the sun, street lamps, or such other things captured in it. As a result, the panoramic image may have an extremely wide dynamic range with great differences between bright portions and dark portions. Thus, if a panoramic image is shot with exposure adjusted to a specific object, then the resulting image may sometimes have "white-out" in the bright portions and "black-out" in the dark portions. As used herein, "white-out" is complete whitening of portions exposed to strong light, whereas "black-out" is complete blackening of dark portions least exposed to light.

In a normal photo shoot, therefore, an object or objects are captured with correct exposure, or adjustments are made to prevent strong light from entering a field of view, in order to avoid white-out or black-out. However, in the shooting of a panoramic image that covers all directions, it may be out of the question to determine correct exposure matching a specific object or objects. To make up for this shortcoming, a panoramic image is, for instance, synthesized by the use of a high dynamic range synthesis technique. In this technique, a plurality of low dynamic range photos are taken with exposure changed accordingly, and then those photos are put together into an image having a high dynamic range without white-out or black-out. Yet, this high dynamic range synthesis requires use of a high-priced camera or cameras and long shooting and processing time.

SUMMARY OF THE INVENTION

The present invention has been made in view of the foregoing circumstances, and a purpose thereof is to provide a technology for efficiently generating images without white-out or black-out.

In order to resolve the above-described problems, an image generation apparatus according to one embodiment of the present invention includes: An image generation apparatus comprising: a storage configured to store a plurality of low-dynamic-range (LDR) image sets each including a plurality of low-dynamic-range (LDR) segmented images of different pan angles or tilt angles, each LDR image set being of a different exposure level, respectively; a high-dynamic-range (HDR) synthesizing unit configured to combine a plurality of LDR segmented images of different exposure levels so as to generate a high-dynamic-range (HDR) segmented image set including a plurality of high-dynamic-range (HDR) segmented images of different pan angles or tilt angles; and an output image synthesizing unit configured to output an HDR output image by stitching together adjacent HDR segmented images.

Another embodiment of the present invention relates to a method for generating images. The method includes: reading out, by a processor, a plurality of low-dynamic-range (LDR) image sets from a storage device for storing a plurality of LDR image sets each including a plurality of low-dynamic-range (LDR) segmented images of different pan angles or tilt angles, each LDR image set being of a different exposure level, respectively; combining, by a processor, a plurality of LDR segmented images of different exposure levels so as to generate a high-dynamic-range (HDR) segmented image set including a plurality of HDR segmented images of different pan angles or tilt angles; and outputting, by a processor, an HDR output image by stitching together adjacent high dynamic range segmented images.

Still another embodiment of the present invention relates to a program embedded in a non-transitory computer-readable medium. The program includes: a reading module operative to read out a plurality of low-dynamic-range (LDR) image sets from a storage device for storing a plurality of LDR image sets each including a plurality of low-dynamic-range (LDR) segmented images of different pan angles or tilt angles, each LDR image set being of a different exposure level, respectively; a high dynamic range synthesizing module operative to combine a plurality of LDR segmented images of different exposure levels so as to generate a high-dynamic-range (HDR) segmented image set including a plurality of high-dynamic-range (HDR) segmented images of different pan angles or tilt angles; a tone mapping module operative to compress dynamic range of the plurality of HDR segmented images of different pan angles or tilt angles by tone mapping so as to generate a plurality of compressed dynamic range segmented images of different pan angles or tilt angles; and an output image synthesizing module operative to generate an HDR output image by stitching together adjacent HDR segmented images, when the HDR output image is to be generated, and operative to generate an LDR output image by stitching together adjacent segmented images out of the plurality of compressed dynamic range segmented images of different pan angles or tilt angles generated by the tone mapping, when the LDR output image is to be generated.

Optional combinations of the aforementioned constituting elements, and implementations of the invention in the form of methods, apparatuses, systems, computer programs, data structures, recording media and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 9A and FIG. 9B show control points detected between two adjacent segmented images;

FIG. 10 shows how two adjacent segmented images are aligned and combined using control points;

FIGS. 11A and 11B are diagrams for explaining an extended panoramic image having overlapped ends for a panoramic image;

DETAILED DESCRIPTION OF THE INVENTION

A description will be given of an outline of a preferred embodiment. In the present embodiments, a high dynamic range synthesis is performed on low-dynamic-range (LDR) segmented images of different exposures. Thus, the segmented images having a high dynamic range is first generated and then those segmented images are stitched together to generate a panoramic image.

Figure 1:
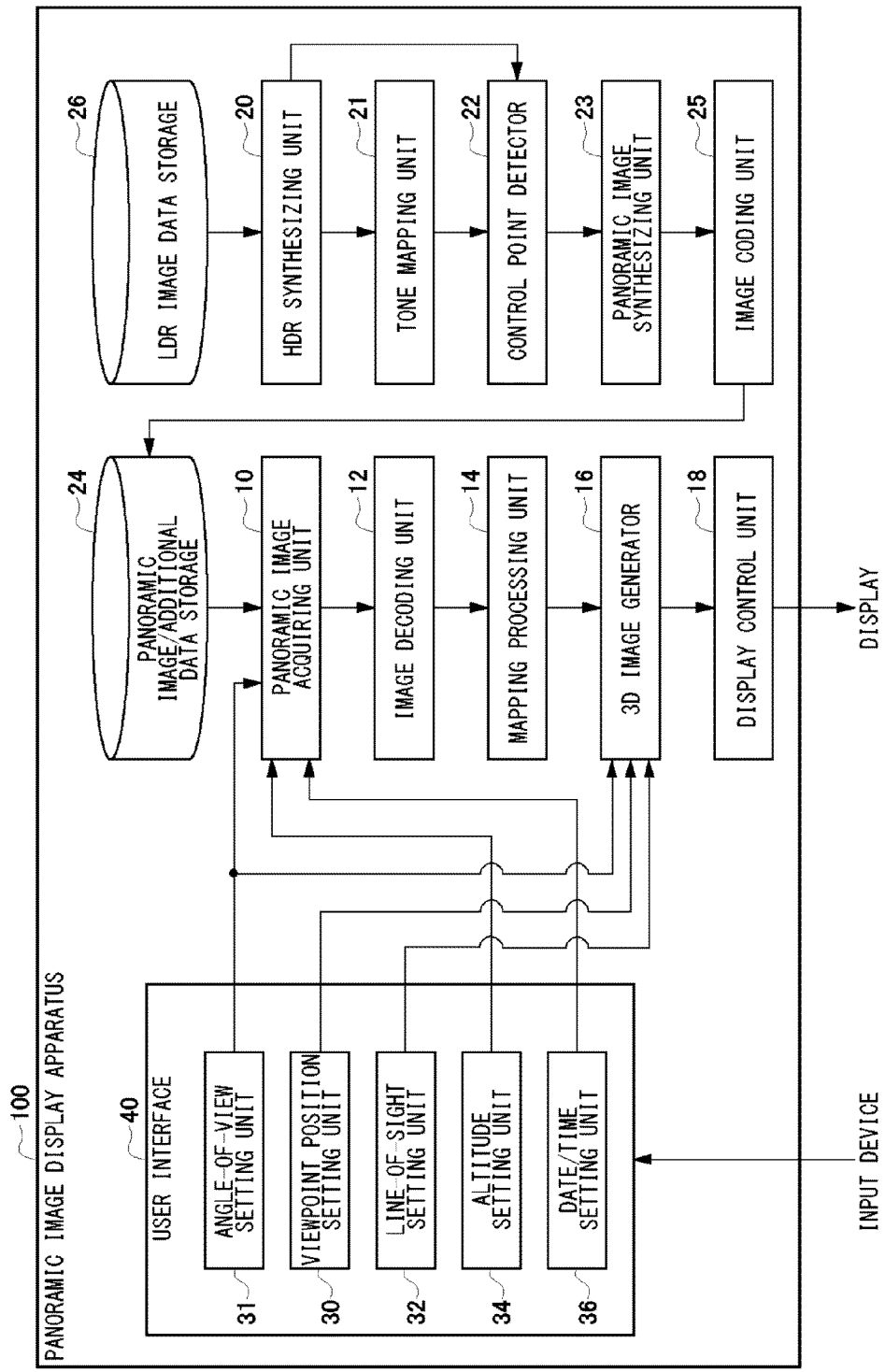
FIG. 1 is a configuration diagram of a panoramic image display apparatus according to an embodiment.

FIG. 1 is a configuration diagram of a panoramic image display apparatus 100 according to a preferred embodiment. For example, the panoramic image display apparatus 100 as shown in FIG. 1 may be functionally configured such that hardware, software or a combination of both is implemented to a personal computer, a game device, a portable device, a mobile terminal and so forth. Part of such functional components may be implemented in a client, so that the panoramic image display apparatus 100 may be realized as a server-client system via a network.

An HDR synthesizing unit 20, a tone mapping unit 21, a control point detector 22, a panoramic image synthesizing unit 23, an image coding unit 25, and an LDR image data storage 26 in the panoramic image display apparatus 100 constitute a panoramic image generation apparatus according to an embodiment. These functional components of the panoramic image generation apparatus may be implemented to a personal computer, a game device, a portable device, a mobile terminal and so forth other than the panoramic image display apparatus 100 and may be connected to the panoramic image display apparatus 100 via a network or a connection cable. Also, the functional components of the panoramic image generation apparatus may be implemented by use of a CPU or memory of a digital camera.

An LDR image data storage 26 stores an LDR image set that includes a plurality of low-dynamic-range (LDR) segmented images captured with a camera panned or tilted. Stored in the LDR image data storage 26 are a plurality of LDR image sets of different exposures. A panoramic image is created by stitching together the segmented images of different pan angles and tilt angles. For easier synthesis, however, the images are shot with overlap in the joint regions of adjacent segmented images. The LDR image set may also be one shot with a plurality of cameras associated with different pan angles or tilt angles for the shooting. It should be noted that the segmented images whether they are shot with a single camera panned or tilted or with a plurality of cameras associated with different pan angles or tilt angles for the shooting are referred to herein simply as "segmented images of different pan angles or tilt angles".

The HDR synthesizing unit 20 generates a plurality of high-dynamic-range (HDR) image sets of different pan angles or tilt angles as follows. That is, those HDR segmented images are generated by reading out a plurality of LDR image sets of different exposures from the LDR image data storage 26 and synthesizing a plurality of low-dynamic-range segmented images of different exposures for each of the combinations of pan angle and tilt angle at which the segmented images have been shot.

The tone mapping unit 21, which is configured to operate when a panoramic image of low dynamic range is to be generated, does not operate when a panoramic image of high dynamic range is to be generated.

A description will first be given of a case where a panoramic image of high dynamic range is to be generated.

The HDR synthesizing unit 20 supplies a plurality of generated high-dynamic-range segmented images of different pan angles or tilt angles to the control point detector 22. The control point detector 22 detects control points for associating adjacent high-dynamic-range segmented images with each other by extracting feature points between the adjacent segmented images out of the plurality of high-dynamic-range segmented images of different pan angles or tilt angles.

A technology known in the art for image matching may be used in a process of feature point extraction. Upon completion of the processing for feature point extraction, control points best suited for the association of adjacent segmented images are selected from among the extracted feature points. While there are a multiplicity of feature points that are extracted, it is desirable that the control points be scattered evenly over the entire joint regions of adjacent segmented images. The control points scattered evenly over the entire joint regions will accomplish alignment of adjacent segmented images with high accuracy.

The panoramic image synthesizing unit 23 synthesizes a high-dynamic-range panoramic image by adjusting the alignment of the adjacent high-dynamic-range segmented images using the detected control points, thereby generating a panoramic image of high dynamic range. In other words, the synthesis is carried out by rotating segmented images in such a manner as to achieve a maximum agreement between the corresponding control points of adjacent segmented images, that is, to minimize the total of gaps between the corresponding control points of adjacent segmented images.

Next, a description will be given of a case where a panoramic image of low dynamic range is to be generated.

When a panoramic image of low dynamic range is to be generated, the tone mapping unit 21 is operated. The HDR synthesizing unit 20 supplies a plurality of generated high-dynamic-range segmented images of different pan angles or tilt angles to the tone mapping unit 21. The tone mapping unit 21 generates a plurality of compressed dynamic range segmented images of different pan angles or tilt angles by compressing the dynamic range of the plurality of high-dynamic-range segmented images of different pan angles or tilt angles by tone mapping.

The control point detector 22 detects control points for associating adjacent compressed dynamic range segmented images with each other by extracting feature points between the adjacent segmented images out of the plurality of compressed dynamic range segmented images of different pan angles or tilt angles.

The panoramic image synthesizing unit 23 synthesizes a low-dynamic-range panoramic image by adjusting the alignment of the adjacent compressed dynamic range segmented images using the detected control points, thereby generating a panoramic image of low dynamic range.

The image coding unit 25 codes the panoramic image of high dynamic range or low dynamic range combined by the panoramic image synthesizing unit 23. In so doing, an extended panoramic image is generated such that part of a region at a right end of the panoramic image is added to a left end thereof and such that part of a region at the left end thereof is added to the right end thereof. And the thus generated extended panoramic image is compressed and coded. If the panoramic image is a moving image or moving images, the image coding unit 25 will perform motion-compensated prediction on the extended panoramic image on a macroblock-by-macroblock basis and then compress and code the thus processed extended panoramic image. The image coding unit 25 stores the coded panoramic image in a panoramic image/additional data storage 24.

The panoramic image/additional data storage 24 stores panoramic images having information on shooting locations and information on shooting orientations associated with each other. The additional data, such as information on shooting locations and shooting orientations, may be added directly to a data file of panoramic images, or may be managed as a separate file from the panoramic images.

The information on shooting locations includes, for instance, information on latitudes and longitudes which is given by GPS (Global Positioning System). The information on shooting orientation includes, for instance, information on the azimuth (angle of orientation) of the center point of a panoramic image obtained from an azimuth sensor, and may also additionally include information on the elevation angle and roll angle of a camera at the time of shooting.

If the azimuth of the center point of a panoramic image is given as information on a shooting orientation, then it is possible to calculate the orientation of an arbitrary point of the panoramic image based on the angle of panning the camera to the right or left. The panoramic images may have, as the information on the shooting orientations, the coordinate values of pixels in the orientations of true north, true south, true east, and true west of the panoramic images which are calculated based on the azimuths and pan angles of the center points of the panoramic images.

A panoramic image acquiring unit 10 acquires a panoramic image to be displayed from the panoramic image/additional data storage 24. The panoramic image to be displayed is identified as the user specifies a shooting location on a map or the like.

An image decoding unit 12 decodes the extended panoramic image acquired by the panoramic image acquiring unit 10, then trims the overlapped regions at both ends of the extended panoramic image, and supplies the reproduced panoramic image to the mapping processing unit 14. If the extended panoramic image acquired by the panoramic image acquiring unit 10 is a moving image or moving images coded by the motion-compensated prediction, the image decoding unit 12 will trim the overlapped regions at the both ends thereof and supplies a frame or frames of the reproduced moving image(s) to a mapping processing unit 14.

The mapping processing unit 14 processes a mapping of a panoramic image onto a three-dimensional panoramic space as textures.

In the case of a spherical, or omnidirectional (celestial), panoramic image, a sphere is assumed as a three-dimensional panoramic space, and the panoramic image is texture-mapped onto the spherical surface by a sphere mapping. Or a cube may be assumed as a three-dimensional panoramic space, and the panoramic image may be texture-mapped onto the cubic surface by a cube mapping. Also, in the case where the panoramic image does not have any component in tilt directions and spreads only in the panning directions, a cylinder may be assumed as a three-dimensional panoramic space, and the panoramic image may be texture-mapped onto the cylindrical surface by a texture mapping. The same applies to the case where the panoramic image does not have any component in the panning directions and spreads only in tilt directions.

A 3D image generator 16 generates a three-dimensional (3D) panoramic image when the 3D panoramic space having a panoramic image texture-mapped thereon by the mapping processing unit 14 is viewed in a specified line of sight. When the 3D panoramic space is a sphere, the viewpoint is placed at the center of the sphere. When the 3D panoramic space is a cube, the viewpoint is placed at the center of the interior of the cube. And when the 3D panoramic space is a cylinder, the viewpoint is placed on the center axis of the cylinder. The viewpoint is the location where the panoramic image to be displayed is shot, and the line of sight is the direction in which the surrounding area is viewed and is thus identified by the azimuth and the elevation angle. The 3D image generator 16 generates a 3D image when the 3D panoramic space is viewed in the line of sight identified by the azimuth and the elevation angle.

A display control unit 18 has a 3D panoramic image or a map image thus generated displayed on a screen of the display unit.

Figure 2:
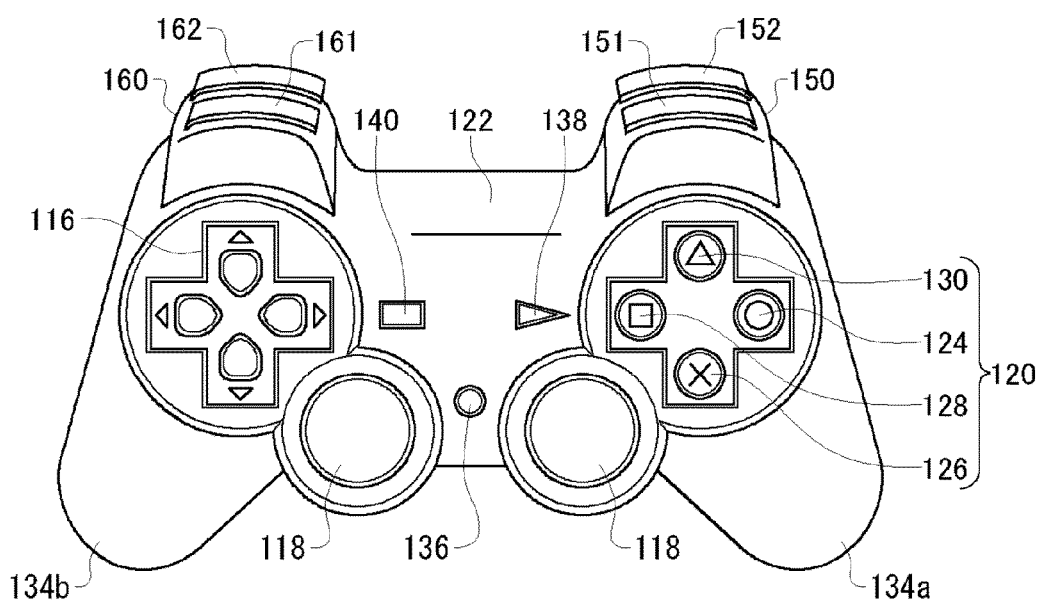
FIG. 2 shows a structure of a controller, connected to the panoramic image display apparatus of FIG. 1, which is an example of an input device.

A user interface 40 is a graphical user interface through which the user can manipulate the graphics displayed on the screen of a display using an input device. The user interface 40 receives user instructions on the map or 3D panoramic image displayed on the screen from the input device which may be a controller of a game device, a mouse, a keyboard, or the like. FIG. 2 shows a controller 102 as an example of the input device, whose construction will be discussed in detail later.

The user interface 40 instructs the panoramic image acquiring unit 10 to acquire a specified panoramic image from the panoramic image/additional data storage 24.

The user can input instructions to change the line of sight for viewing the 3D panoramic space by operating an analog stick 118 or direction keys 116 of the controller 102, for instance. A line-of-sight setting unit 32 of the user interface 40 gives a line of sight instructed by the user to the 3D image generator 16. The 3D image generator 16 generates an image when the 3D panoramic space is viewed in a specified line of sight.

An angle-of-view setting unit 31 sets an angle of view when the user has performed a zoom operation on the panoramic image being displayed and gives the information of the angle of view thus set to the panoramic image acquiring unit 10 and the 3D image generator 16. Where panoramic images of different angles of view are stored in the panoramic image/additional data storage 24, the panoramic image acquiring unit 10 reads out a panoramic image of an angle of view closest to the set angle of view and changes the panoramic image to be displayed. The 3D image generator 16 realizes the visual effects of zoom-in and zoom-out by enlarging or reducing the 3D panoramic image according to the set angle of view.

A panoramic image may have information on the shooting altitude, and the panoramic image/additional data storage 24 may store panoramic images shot at different altitudes at the same shooting location. In such a case, the user can input instructions to change the altitude by operating L1/L2 buttons 161 and 162 provided on the left front of the casing of the controller 102, for instance. Pressing the L1 button 161 will give an instruction to raise the altitude, and pressing the L2 button 162 will give an instruction to lower the altitude.

The display control unit 18 may indicate to the user, for instance, with small arrows at the top and bottom portions of the screen that the panoramic image currently being displayed has panoramic images shot at different altitudes at the same shooting location. An arrow facing upward in the top portion of the screen indicates the presence of a panoramic image shot at a higher altitude than the current one, and an arrow facing downward in the bottom portion of the screen indicates the presence of a panoramic image shot at a lower altitude than the current one.

Upon receipt of an instruction from the user to change the altitude, the altitude setting unit 34 of the user interface 40 instructs the panoramic image acquiring unit 10 to acquire a panoramic image corresponding to the specified altitude, despite the same latitude and longitude, from the panoramic image/additional data storage 24. The panoramic image acquiring unit 10 acquires a panoramic image of a higher shooting altitude than the panoramic image currently being displayed when the L1 button 161 is pressed, and acquires a panoramic image of a lower shooting altitude than the current one when the L2 button 162 is pressed.

When a display is produced by switching to a panoramic image of a different shooting altitude, the display control unit 18 may give a special effect to the image so that the user may have a sense of riding an elevator up or down. For example, when switching to a panoramic image of a higher altitude, the panoramic image currently being displayed can be scrolled downward, thereby having the panoramic image of a higher altitude descend from above with the result that the user may have a sense of having risen upstairs.

A panoramic image contains information on the shooting date and time, and the panoramic image/additional data storage 24 may store panoramic images shot at different dates and times at the same shooting location. In such a case, the user can input instructions to change the date and time by operating R1/R2 buttons 151 and 152 provided on the right front of the casing of the controller 102, for instance. Pressing the R1 button 151 will give an instruction to shift to a later date and time, and pressing the R2 button 152 will give an instruction to shift to an earlier date and time.

The display control unit 18 may indicate to the user, for instance, with watch and calendar icons in the corner of the screen that the panoramic image currently being displayed has panoramic images shot at different dates and times. Watch icons may be displayed to indicate the presence of panoramic images for different times of day such as morning, noon, and night, where a calendar of icons may be displayed to indicate the presence of panoramic images for different seasons such as spring, summer, autumn, and winter.

Upon receipt of an instruction from the user to change the date and time, the date/time setting unit 36 of the user interface 40 instructs the panoramic image acquiring unit 10 to acquire a panoramic image corresponding to a specified date and time at the same shooting location from the panoramic image/additional data storage 24. The panoramic image acquiring unit 10 acquires a panoramic image of a later shooting date and time than the panoramic image currently being displayed when the R1 button 151 is pressed, and acquires a panoramic image of an earlier shooting date and time than the current one when the R2 button 152 is pressed.

Thus, it is possible to switch the panoramic image being displayed to panoramic images of a different time of day or season at the same shooting location, for example, from one shot in the morning to one shot at night, or from one shot in spring to one shot in autumn. In changing the panoramic image, the display control unit 18 may give an effect of fade-in and fade-out to the image.

A viewpoint position setting unit 30 set the shooting location of a panoramic image as a viewpoint position and conveys it to the 3D image generator 16. The line-of-sight setting unit 32 sends the specified line-of-sight to the 3D image generator 16.

FIG. 2 shows a structure of a controller, connected to the panoramic image display apparatus of FIG. 1, which is an example of an input device. The panoramic image display apparatus 100 may be a game device, for instance.

The controller 102 has a plurality of buttons and keys to receive control inputs to the panoramic image display apparatus 100. As the user operates on the buttons or keys of the controller 102, their operation inputs are transmitted to the panoramic image display apparatus 10 through wireless or wired connections.

Provided on a casing top surface 122 of the controller 102 are a group of arrow keys 116, analog sticks 118, and a group of operation buttons 120. The group of direction keys 116 include "up-", "down-", "left-", and "right-" direction indication keys. The group of operation buttons 120 include a circle button 124, a cross button 126, a square button 128, and a triangle button 130.

The user holds a left-hand grip 134b with the left hand and holds a right-hand grip 134a with the right hand, and operates the group of direction keys 116, the analog sticks 118, and the group of operation buttons 120 on the casing top surface 122.

Provided on a front side of the controller 102 are a right-hand operation part 150 and a left-hand operation part 160. The right-hand operation part 150 includes an R1 button and an R2 button, whereas the left-hand operation part 160 includes an L1 button 161 and an L2 button 162.

The user can shift a pointer displayed on the screen in vertical and horizontal directions by operating the directional key group 116. For example, when selecting one of a plurality of markers displayed within a panoramic image, the user can shift the pointer between the plurality of markers on the screen by operating the directional key group 116. The user can select a desired marker by pressing the circle button 124 when the pointer has come upon the marker.

Different functions may be assigned to the respective buttons of operation buttons 120 by a panoramic image display application program. For example, the function to specify the display of a menu is assigned to the triangle button 130, the function to specify the cancel of a selected item is assigned to the cross button 126, the function to specify the determination of a selected item is assigned to the circle button, and the function to specify the display/non-display of table of contents or the like is assigned to the square button 128.

The analog sticks 118 have means to output analog values as they are tipped by the user. The controller 102 sends an analog output signal corresponding to the direction and amount of tipping of the analog stick 118 to the panoramic image display apparatus 100. For example, the user can shift the viewpoint in a desired direction within a 3D panoramic image shown on the display by tipping the analog stick 118 in the desired direction.

The casing top surface 122 is further provided with an LED button 136, a selector button 140, and a start button 138. The LED button 136 is used as the button for the display of the menu screen on the display, for instance. The start button 138 is the button with which the user instructs the start of a panoramic image display application, the start or pause of playback of a panoramic image, or the like. The selector button 140 is the button with which the user instructs a selection from a menu display shown on the display or the like.

FIGS. 3A to 3D are illustrations with which to explain the mechanism and shooting directions of an omnidirectional image shooting system 230 used to shoot panoramic images.

Figure 3A:
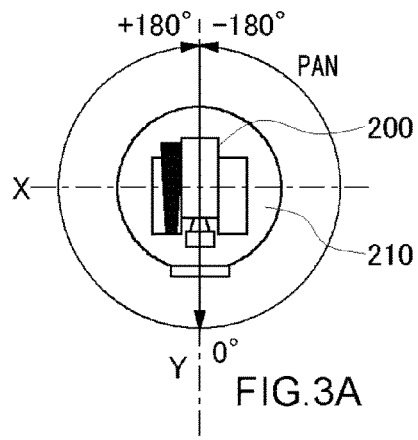
FIGS. 3A to 3D are illustrations with which to explain the mechanism and shooting directions of an omnidirectional image shooting system used to shoot panoramic images.
Figure 3B:
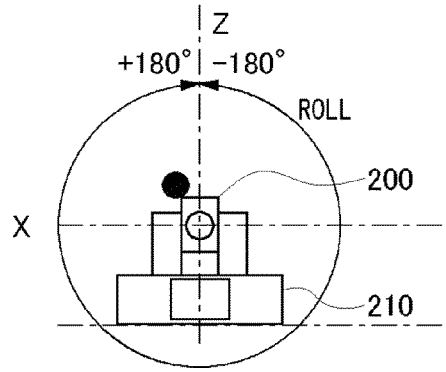
Figure 3C:
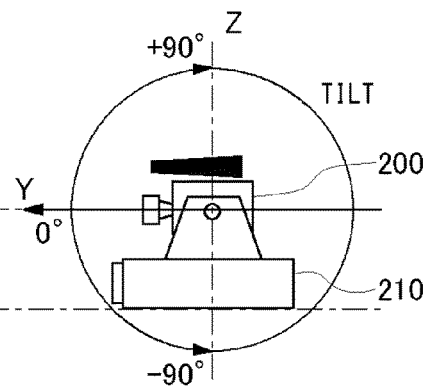
Figure 3D:
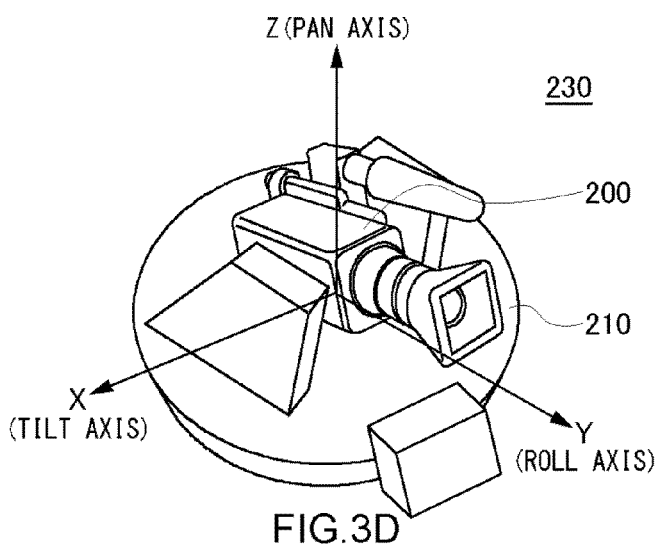

As shown in FIG. 3D, a camera 200 in the omnidirectional image shooting system 230 is secured onto a control disk 210. And a camera's pan angle can be changed as the control disk 210 is rotated around a Z axis, a camera's tilt angle can be changed as the control disk 210 is rotated around an X axis, and a camera's roll angle can be changed as the control disk 210 is rotated around a Y axis. The Z axis herein is the vertical axis (gravitational direction axis).

FIG. 3A is a top view of the camera 200 installed on the control disk 210. The initial position (Y-axis direction) of the control disk is pan angle 0°, and the pan angle can be changed within a range of −180° to +180° around the Z axis.

FIG. 3B is a front view of the camera 200 installed on the control disk 210. The horizontal state of the control disk 210 is roll angle 0°, and the roll angle can be changed within a range of −180° to +180° around the Y axis.

FIG. 3C is a side view of the camera 200 installed on the control disk 210. The horizontal state of the control disk 210 is tilt angle 0°, and the tilt angle can be changed within a range of −90° to +90° around the X axis.

In order to endow a panoramic image shot by the omnidirectional image shooting system 230 of FIG. 3D with information on the shooting orientations, it is necessary to record the orientations of the camera 200 at the time of image taking. For that purpose, the omnidirectional image shooting system 230 is provided with an azimuth sensor for measuring orientations and an acceleration sensor for measuring tilt angles. The omnidirectional image shooting system 230 is further provided with a GPS sensor or the like for measuring the shooting location and time.

Figure 4A:
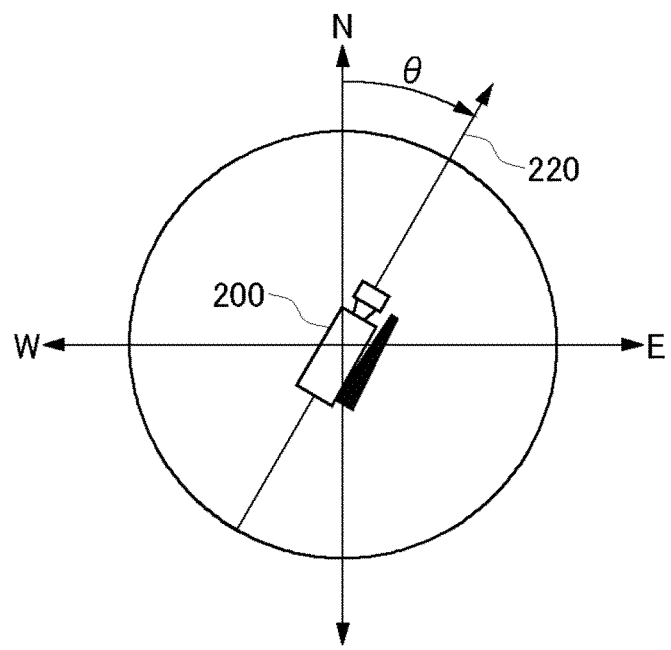
FIG. 4A is an illustration with which to explain azimuth angle θ of a camera.
Figure 4B:
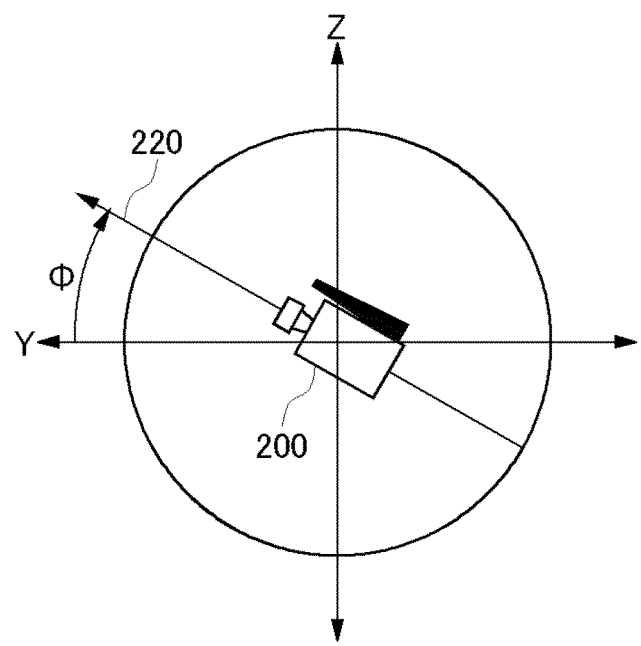
FIG. 4B is an illustration with which to explain elevation angle φ of a camera.

FIG. 4A is an illustration with which to explain azimuth angle θ of the camera 200, and FIG. 4B is an illustration with which to explain elevation angle φ of the camera 200. FIG. 4A is a top view of the camera 200, in which the camera 200 in an initial position of shooting faces a direction 220 which is azimuth angle θ displaced from true north to east. This direction is equal to pan angle 0°. In other words, the azimuth angle of the reference direction 220 of the pan angle is θ. When shooting a panoramic image, the image of an object is taken panoramically by changing the pan angle in a range of −180° to +180° with respect to the reference direction 220 of the azimuth angle θ.

FIG. 4B is a side view of the camera 200. The elevation angle φ is the direction of tilt 0°, which is an angle where an upper direction is defined to be positive in relation to the Y-axis direction, when the camera 200 is rotated around the X axis. Normally, the elevation angle φ is 0° since the image taking is done with the camera 200 set in a horizontal position. To shoot a spherical panoramic image, however, it is necessary to take the images of the object by changing the elevation angle φ with the tilt of the camera.

Figure 5A:
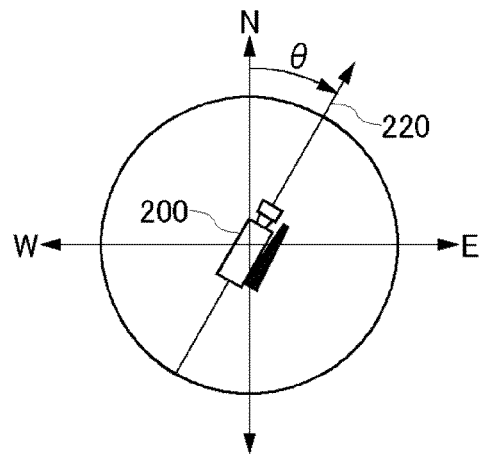
FIGS. 5A to 5C are illustrations with which to explain a panoramic image shot when an initial position of a camera is in a direction of azimuth angle θ.
Figure 5B:
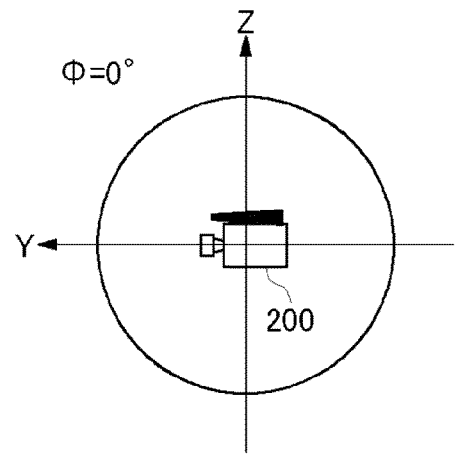
Figure 5C:
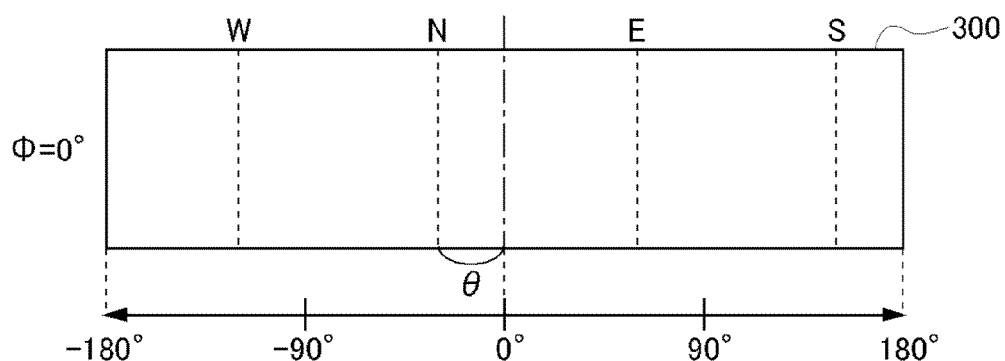

FIGS. 5A to 5C are illustrations with which to explain a panoramic image shot when the initial position of the camera 200 is in a direction of the azimuth angle θ.

As shown in the top view of FIG. 5A, the camera 200 in the initial position faces the direction 220 of azimuth angle θ. And as shown in the side view of FIG. 5B, the elevation angle of the camera 200 is φ=0°. With the elevation angle kept at φ=0°, an omnidirectional panoramic view is shot at the elevation angle φ=0° while the pan angle of the camera 200 with respect to the reference direction 220 is varied within a range of −180° to +180°. FIG. 5C is a panoramic image 300 taken in the above-described manner. At the center of the panoramic image 300, the pan angle is 0°. The left half of the panoramic image 300 is an image such that it is taken by varying the pan angle within a range of 0° to −180°. Similarly, the right half of the panoramic image 300 is an image such that it is taken by varying the pan angle within a range of 0° to 180°.

The central position of the pan angle 0° is displaced from true north by azimuth angle θ. Thus, the positions of north (N), south (S), east (E), and west (W) are those indicated by dotted lines. As long as the panoramic image 300 contains the azimuth angle θ of the central position of pan angle 0° as the information on the shooting orientations, the pixel positions of north (N), south (S), east (E), and west (W) can be evaluated in consideration of a displacement of the azimuth angle θ. Alternatively, instead of the azimuth angle θ, the coordinate values of pixel positions of north (N), south (S), east (E), and west (W) may be used as the information on the shooting orientations.

In order to obtain a spherical panoramic image, it is necessary to take images by varying the elevation angle of the camera 200. For example, if the angle of view of the camera 200 is 60°, a spherical panoramic image can be theoretically obtained as follows. That is, the camera 200 is tilted vertically at ±60®, and the similar image taking is done by varying the pan angle within a range of −180° to +180°.

Figure 6A:
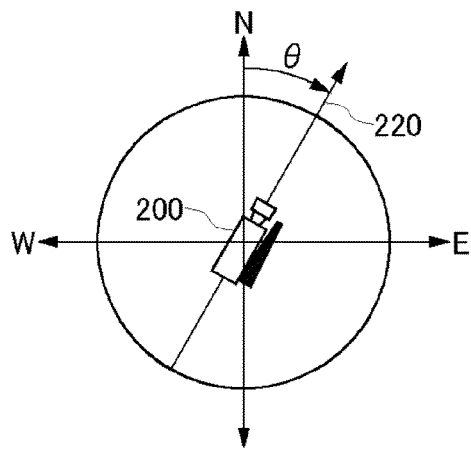
FIGS. 6A to 6C are illustrations with which to explain a panoramic image shot when a camera is in a direction of elevation angle φ=60°.
Figure 6B:
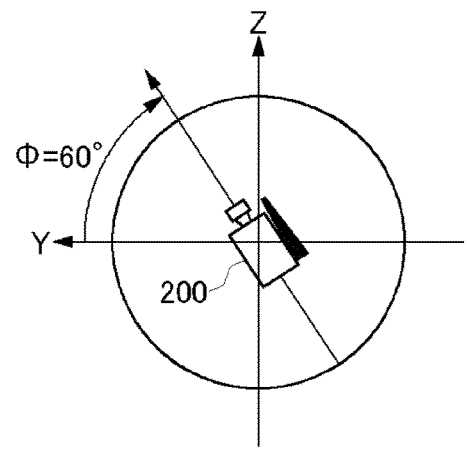
Figure 6C:
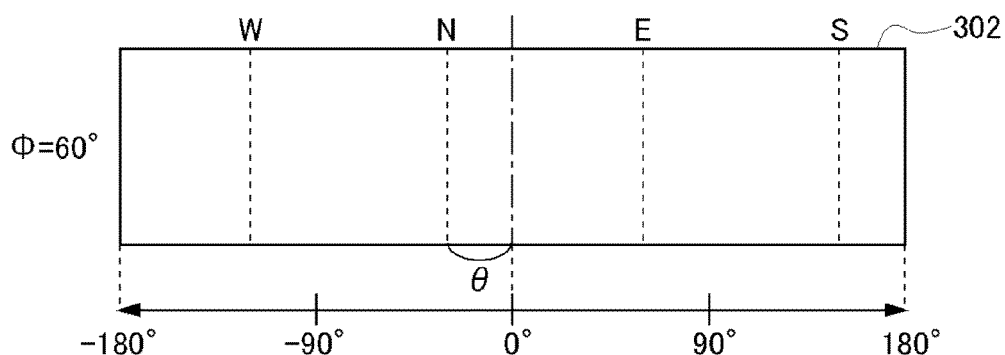

FIGS. 6A to 6C are illustrations with which to explain a panoramic image shot when a camera 200 is in a direction of elevation angle φ=60°. As shown in the top view of FIG. 6A, the camera 200 in the initial position faces the direction 220 of azimuth angle θ. And as shown in the side view of FIG. 6B, the elevation angle of the camera 200 is φ=0°. With the elevation angle kept at φ=60°, a panoramic view 302 as shown in FIG. 6C is shot at the elevation angle φ=60° while the pan angle of the camera 220 with respect to the reference direction 220 is varied within a range of −180° to +180°.

With the elevation angle kept at φ=−60°, a panoramic view 302 is similarly shot at the elevation angle θ=−60° while the pan angle is varied within a range of −180° to +180°. A spherical panoramic image is obtained by combining the panoramic images shot at the elevation angles φ=0°, 60°, and −60°. However, in implementation, a method is often employed where the vicinities of a boundary (bordering areas) are taken in an overlapped manner, in order to correct the mismatch caused by lens distortions when images are stitched together in boundary portions at the angle of view.

The spherical panoramic image obtained as described above is endowed with information on azimuth angles and elevation angles. Therefore, it is possible to identify the azimuth and elevation angle of an arbitrary pixel of the panoramic image based on the information. Also, the panoramic image is provided with the latitude and longitude information measured by GPS as the positional information of the shooting location. The additional information to be attached to the panoramic image may be recorded, for example, in the format of image file called Exif (Exchangeable Image File Format). The place-name of the shooting location can be recorded in a part of the file name, whereas the shooting date and time, the latitude and longitude of the shooting location, the altitude, the azimuth angle, and the like can be recorded as data in the Exif format. The elevation angle, which is not defined in the Exif format, is recorded as extended data.

Figure 7A:
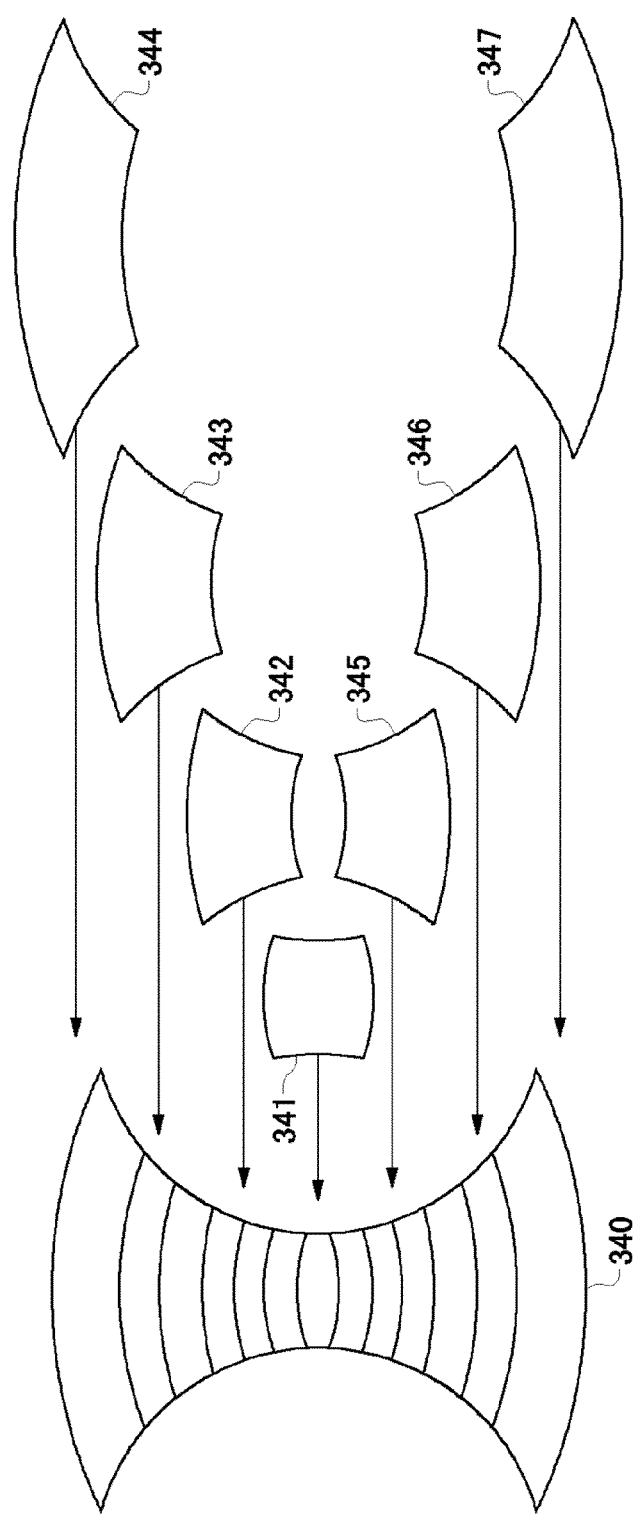
FIG. 7A explains a method of how a panoramic image is created by stitching a plurality of images together.
Figure 7B:
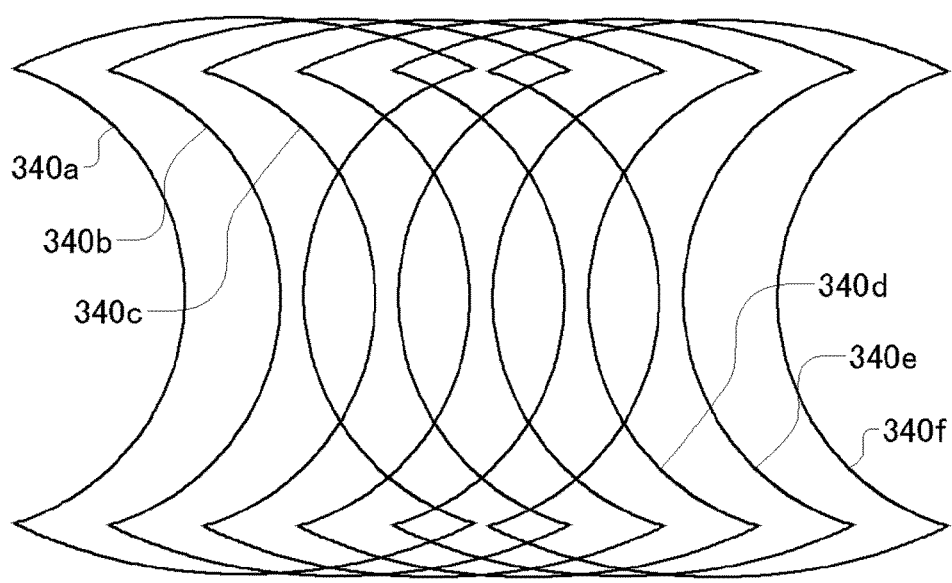
FIG. 7B explains a method of how a panoramic image is created by stitching a plurality of images together.

FIG. 7A and FIG. 7B are illustrations with which to explain a method of creating a panoramic image by stitching a plurality of images together.

In the example of FIG. 7A, seven images 341 to 347 shot by tilting (or panning) the camera 200 are mapped into a cylinder and then stitched together to prepare a cylindrical image 340. When the images are stitched together, the bordering areas of the images are overlapped with each other.

As shown in FIG. 7B, a plurality of cylindrical images like one shown in FIG. 7A are obtained in the panning (or tilting) direction by the shooting with the panning (or tilting) of the camera 200. An omnidirectional panoramic image 360 is finally obtained by synthesizing these cylindrical images 340a to 340f with the bordering areas of the images overlapped.

Figure 8:
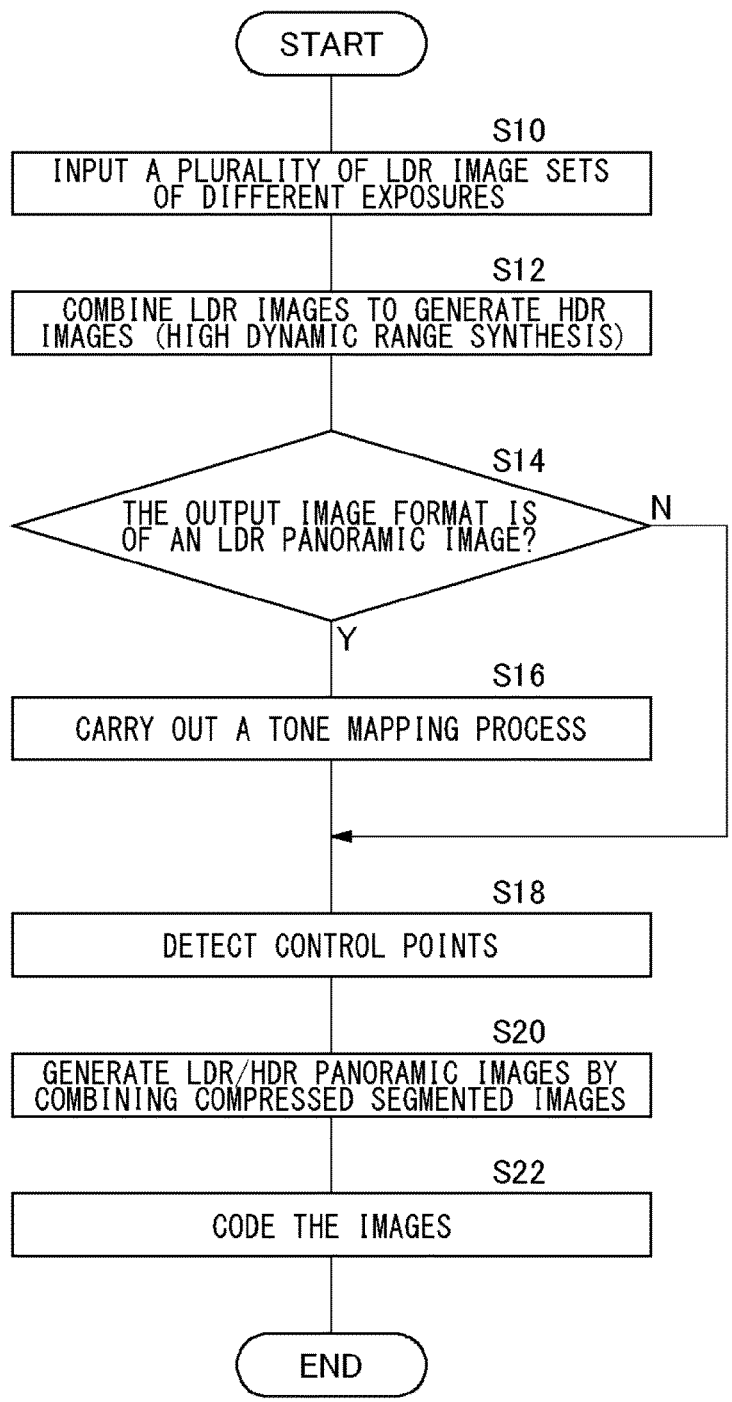
FIG. 8 is a flowchart showing a procedure for generating a panoramic image by the panoramic image display apparatus of FIG. 1.

FIG. 8 is a flowchart showing a procedure for generating a panoramic image by the panoramic image display apparatus 100. With reference to FIGS. 9A and 9B to FIGS. 11A and 11B, each step in the procedure for generating a panoramic image of FIG. 8. In the flowchart shown in FIG. 8, the procedure of each structural component is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S14)". If, on the other hand, the decision result is negative, "N" (the capital letter of "No") will be appended like "(N of S14)".

A plurality of LDR image sets of different exposures are inputted (S10). Each LDR image set includes a plurality of low dynamic rage segmented images that differ in at least one of pan angle and tilt angle.

The HDR synthesizing unit 20 combines or synthesizes a plurality of LDR segmented images of different exposure for each of the combinations of pan angle and tilt angle at which the segmented images have been shot, and thereby generates a plurality of HDR segmented images of different pan angles or tilt angles (S12). A technology known in the art may be used in this high dynamic range synthesis technique. Regions where the segments obviously having black-out and white-out are excluded from a plurality of LDR images of different exposures are selected and synthesized. Thus, HDR images free from white-out and black out over the entire regions are generated.

If the output image format is of an LDR panoramic image (Y of S14), a tone mapping process of Step S16 will be carried out. The tone mapping unit 21 performs the tone mapping process on the HDR segmented images generated by the HDR synthesizing unit 20, compresses the dynamic range, and thereby converts the HDR segmented images into the compressed dynamic range segmented images. A technique of the tone mapping may be a method for reducing the contrast of the entire image and a method where the images are converted non-linearly by mimicking the human's visual features, for instance. With the tone mapping process of Step S16 completed, the procedure advances to Step S18.

If the output image format is of an HDR panoramic image (N of S14), the tone mapping process of Step S16 will be skipped and the procedure will advance to Step S18.

The control point detector 22 extracts control points between adjacent segmented images out of a plurality of compressed dynamic range segmented images/HDR segmented images of different pan angles or tilt angles, and thereby detects control points for associating adjacent segmented images with each other (S18).

FIG. 9A and FIG. 9B show control points detected between two adjacent segmented images 401 and 402. In FIG. 9A and FIG. 9B, nine control points are detected.

The panoramic synthesizing unit 23 generates LDR/HDR panoramic images by adjusting the alignment of and synthesizing the adjacent compressed dynamic range segmented images based on the detected control points (S20).

FIG. 10 shows how the two adjacent segmented images 401 and 402 are aligned and combined using control points. The segmented image 402 is rotated relative to the other segmented image 401 in such a manner that the control points of the segmented image 401 and those of the segmented image 402 can achieve a maximum agreement between the corresponding points (indicated by circles in FIG. 10) in their overlapped region The image coding unit 25 codes the LDR/HDR panoramic images obtained by adjusting the alignment of and synthesizing the images (S22). At this time, part of a region at a right end of the panoramic image is added to a left end thereof, and part of a region at the left end thereof is added to the right end thereof. And the thus generated extended panoramic image is compressed and coded, so that the block noise is reduced. If the panoramic image is a moving image or moving images, the image coding unit 25 will perform the macroblock-by-macroblock motion-compensated prediction on the extended panoramic image and code the thus processed extended panoramic image. As a result, motion-compensated prediction that suppresses the block noise can be performed even though there is a motion across the border lines at the both ends of the panoramic image.

FIGS. 11A and 11B are diagrams for explaining an extended panoramic image having overlapped ends for a panoramic image. FIG. 11A represents a panoramic image 500 shot with the camera panned 360 degrees. The panoramic image 500, when it is a moving image, is subjected to a predictive coding by referencing the pixels in peripheral regions using macroblock-by-macroblock motion vectors. Yet, the panoramic image 500 whose right end and left end have no peripheral pixels on their right and left, respectively, is bound to produce block noise. Thus, when the panoramic image 500 is pasted to a sphere, unnatural border lines may appear at the joints during reproduction of moving images.

To solve this problem, the panoramic image 500 is extended by copying a right end region and a left end region thereof at the left end and the right end thereof, respectively. FIG. 11B shows an extended panoramic image 510. If the right end region 502 and the left end region 504 are each a region for a pan angle of 20 degrees, then the extended panoramic image 510 will be in an extended form for the pan angle of 400 degrees. Now the macroblock-by-macroblock motion-compensated predictive coding is performed on this extended panoramic image 510, and the block noise to occur at the right end and the left end of the panoramic image 500 will be minimized.

With the motion-compensated predictive coding on the extended panoramic image 510 of FIG. 11B completed, the copied right end region 502 and left end region 504 are deleted to regain the panoramic image 500 of FIG. 11A. After that, when the panoramic image 500 is pasted to the sphere (celestial sphere), border lines may not appear at the joints during reproduction of moving images because block noise at the joints is minimized.

Next, with reference to FIG. 12 to FIG. 14, a detailed description will be given of the advantages of the techniques of the present embodiment in generating an HDR/LDR panoramic image from a plurality of LDR segmented images of different pan angles or tilt angles.

Figure 12:
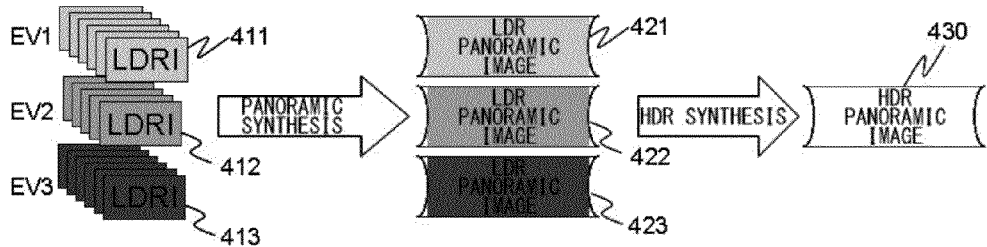
FIG. 12 is an illustration for explaining a conventional technique for generating an HDR panoramic image from LDR segmented images for the purpose of comparison.

FIG. 12 is an illustration for explaining a conventional technique for generating an HDR panoramic image from LDR segmented images for the purpose of comparison.

In this example, there are three sets of a plurality of LDR segmented images of different pan angles or tilt angles, with the exposure of each set differing from each other. The exposure values of LDR segmented image sets 411, 412, and 413 are EV1, EV2, and EV3, respectively, the values descending in this order. Each of the LDR segmented image sets 411, 412, and 413 includes six LDR segmented images of different pan angles or tilt angles. For example, the six LDR segmented images are shot with the pan angle changed in three stages (p1, p2, p3) and the tilt angle changed in two stages (t1, t2).

Although three levels of exposure value are used here for convenience of explanation, the number N of exposure levels must be about 8 or more in actual implementations. Also, the number P of shots in the panning direction is given by P=360/(horizontal angle of view×0.8), whereas the number T of shots in the tilting direction is given by T=180/(vertical angle of view×0.8). Notice that there may be cases where one each of zenith and nadir shots is added to these in the tilting direction. Multiplication by the factor 0.8 is to provide an overlapped region between adjacent segmented images. The total number M of segmented image shots can be given by N×P×T.

Using the conventional technique, an LDR panoramic image 421 is generated by synthesizing the LDR segmented image set 411 of the exposure value EV1. Similarly, an LDR panoramic image 422 and an LDR panoramic image 423 are generated by synthesizing the LDR segmented image set 412 of the exposure value EV2 and the LDR segmented image set 413 of the exposure value EV3, respectively. When a panoramic image is generated by synthesizing segmented images, matching is performed by detecting control points in the overlapped region of adjacent segmented images.

In doing so, there may possibly be some white-outs or black-outs within an LDR segmented image set shot at a certain exposure value because of improper exposure of some segmented images. This is because there may be portions having been exposed to strong light or portions extremely dark in some of the segmented images shot with the pan angle or the tilt angle changed. Since it is difficult to extract feature points from the segmented images having white-outs or black-outs, the control points cannot be set, or even if they can be set, the control points may be located unevenly or fewer in number. As a result, it is not possible to stitch together adjacent segmented images with perfection, thus ending up in an inferior synthesis of a panoramic image.

Next, an HDR panoramic image 430 is generated by a high dynamic range synthesis of the LDR panoramic image 421 of the exposure value EV1, the LDR panoramic image 422 of the exposure value EV2, and the LDR panoramic image 423 of the exposure value EV3. However, as mentioned above, the LDR panoramic images 421, 422, and 423 may possibly include ones of inferior synthesis due to white-outs or black-outs. Therefore, the HDR panoramic image 430 finally synthesized may turn out inferior in accuracy.

Figure 13:
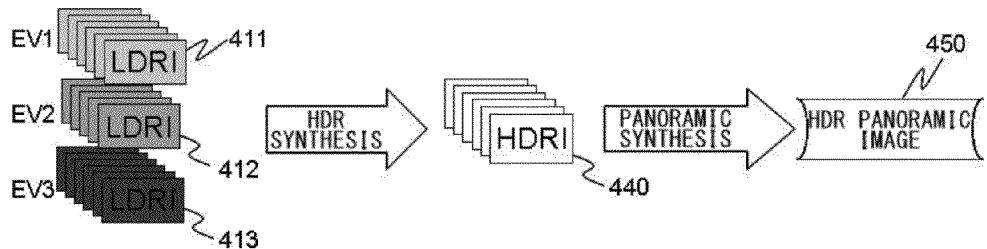
FIG. 13 is an illustration for explaining a technique used in an embodiment for generating an HDR panoramic image from LDR segmented images.

FIG. 13 is an illustration for explaining a technique of the present embodiment for generating an HDR panoramic image from LDR segmented images.

In the present embodiment, an HDR panoramic image is generated by first generating a set of HDR segmented images by a high dynamic range synthesis on the sets of LDR segmented images of different exposure values and then synthesizing them into a panoramic image.

An HDR panoramic image set 440 is generated by a high dynamic range synthesis of the LDR segmented image sets 411, 412, and 413 of the exposure values EV1, EV2, and EV3, respectively. The HDR segmented image set 440 includes six HDR segmented images of different pan angles or tilt angles. Next, an HDR panoramic image 450 is generated by synthesizing the set of HDR panoramic images 440.

According to this method, for an LDR segmented image of pan angle p1 and tilt angle t1, for instance, an HDR segmented image of pan angle p1 and tilt angle t1 is generated by performing a high dynamic range synthesis on LDR segmented images of three exposure values EV1, EV2, and EV3. Accordingly, when the HDR segmented image is generated, the problem of white-outs or black-outs having occurred with the LDR segmented images can be eliminated. When the HDR panoramic image 450 is generated by synthesizing the set of HDR segmented images 440, the six HDR segmented images are free from white-outs or black-outs. Therefore, control points can be detected with high accuracy by reliably extracting feature points from the overlapped region of adjacent segmented images. The HDR panoramic image 450 thus synthesized will turn out superior.

Figure 14:
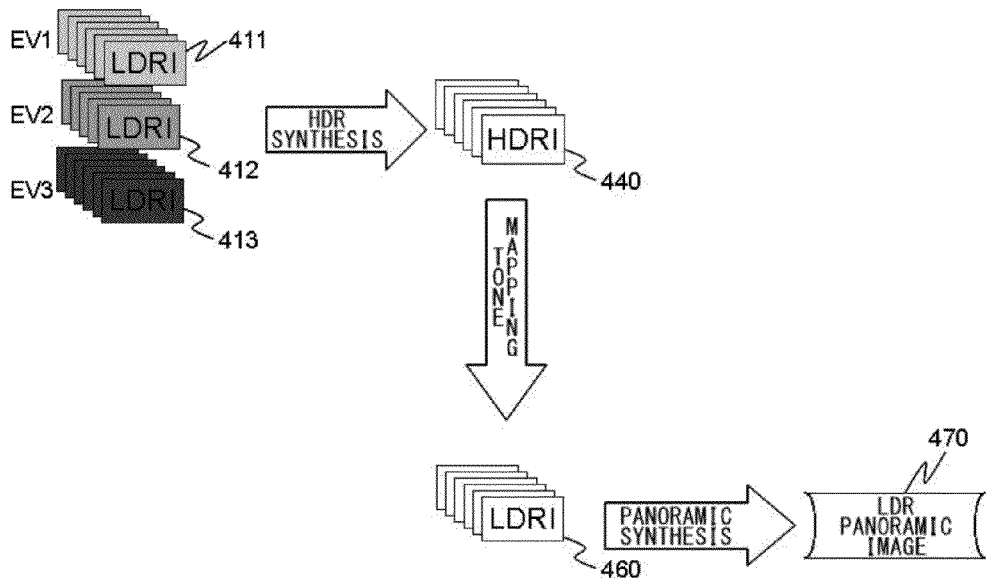
FIG. 14 is an illustration for explaining another technique of an embodiment for generating an LDR panoramic image from LDR segmented images.

FIG. 14 is an illustration for explaining another technique of the present embodiment for generating an LDR panoramic image from LDR segmented images. It differs from the technique of FIG. 13 in that a tone mapping is performed on the HDR segmented image set 440, which has been obtained through a high dynamic range synthesis on the LDR segmented image sets 411, 412, and 413 of the exposure values EV1, EV2, and EV3, respectively, and an LDR panoramic image 470 is synthesized after this conversion of the HDR segmented image set 440 into an LDR segmented image set 460. In this case, too, when the HDR segmented image set 440 is generated, the problem of white-outs or black-outs has been eliminated. Therefore, when the LDR segmented image set 460 with lowered dynamic range is to be synthesized, the problem of inability to detect control points will not occur.

As described above, the techniques of the present embodiments as shown in FIG. 13 and FIG. 14 display markedly improved accuracy of the panoramic image over that of the conventional technique of FIG. 12. The methods of generating panoramic images according to the present embodiments have advantages in processing efficiency and other aspects.

The conventional technique requires more processing time because the LDR panoramic image is generated by detecting control points for the LDR segmented image sets of their respective exposure values. In contrast to this, the techniques of the present embodiments generate the HDR panoramic image by detecting control points after the generation of an HDR segmented image set in advance. Accordingly, the processing time is reduced to 1/N of that of the conventional technique when N is the number of exposure levels.

Also, the conventional technique generates the LDR panoramic image from a plurality of LDR segmented images for each exposure value. Therefore, it requires the total number M of shots (M=number N of exposure levels×number P of pan stages×number T of tilt stages), thus taking more shooting time. Moreover, because of the longer shooting time, any movement of objects may result in the shifting of the objects between LDR panoramic images of different exposure values. As a result, the HDR panoramic image, when synthesized, may present an image containing blurs of the objects.

In contrast to this, the techniques of the present embodiments have no need for images of exposure values that are prone to cause white-outs or black-outs. Therefore, without the shooting at such exposure values, HDR segmented images of sufficient accuracy can be generated. The image taking may be done by previously determining proper exposure values in the respective shooting directions by scanning the whole sphere or determining proper exposure values in the respective shooting directions based on the direction of light. That is, there is no need for shooting for all the exposure values. Thus the shooting time can be shortened, and the processing time for HDR synthesis can be shortened also.

Moreover, the capacity of the techniques of the present embodiments to shorten the shooting time can reduce the possibilities of capturing fast-moving objects such as birds and airplanes. Even when there are LDR segmented images having captured such moving objects, those images can be deleted. With the presence of LDR segmented images for the same area at other exposure values, an HDR segmented image with sufficient accuracy can be produced.

As described above, the panoramic image display apparatus according to the present embodiments can generate HDR/LDR panoramic images from LDR segmented images efficiently with high accuracy. In the past, the shooting of panoramic images in low dynamic range has tended to produce inferior panoramic images due to the inability to shoot omnidirectionally at proper exposure particularly when the front is bright against dark background. According to the techniques of generating panoramic images of the present embodiments, HDR segmented images are first generated from LDR segmented images shot with the exposure varied before the panoramic image is synthesized. Thus superior panoramic images adjusted omnidirectionally for proper exposure values can be obtained.

The problem of white-outs or black-outs unavoidable with the LDR segmented images is solved by this high dynamic range processing. Hence, a panoramic image can also be synthesized from HDR segmented images with high accuracy. Also, the shooting time can be markedly shortened by refraining from the shooting at exposure values that are prone to cause white-outs or black-outs. Moreover, even when there are unexpectedly LDR segmented images having captured some fast-moving object, such an image can be deleted and an HDR segmented image can be generated. This provides increased resistance to noise.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

The description thus far has assumed the mapping of a panoramic image on a 3D panoramic space such as a spherical surface and the display on the screen of a 3D panoramic image as the 3D panoramic space is viewed along the specified line of sight. However, the panoramic image may be displayed simply two-dimensionally. Then there is no need for the mapping processor 14 and the 3D image generator 16 as part of the constitution. This will simplify the panoramic image display apparatus 100.

Panoramic images herein are not limited to ones shot by the omnidirectional image shooting system as shown in FIG. 3, but they may be ones shot through a fish-eye lens or ones synthesized from a plurality of images shot with a normal digital camera in different shooting directions.

Components, which are mainly involved in the processings of HDR synthesis, tone mapping, detection of control points, panoramic image synthesis, and image coding, in the functional components of the panoramic image display apparatus 100 may be implemented in a server. Also, components, which are mainly involved in the decoding and reproduction of panoramic image may be implemented in a client. Hence, the panoramic image display apparatus 100 may be realized as a server-client system via a network. The server may generate HDR/LDR panoramic images from the LDR segmented images and code them, whereas the client may receive the coded streams of panoramic images from the server and decode and display them.

The "panoramic image" as used in this patent specification is not limited to a "panorama" image in the narrow sense, namely a horizontally or vertically long image or a panoramic view of 360 degrees, but simply an image that covers a wide range of area. Also, explained in the embodiments is an example where a panoramic image is generated as a synthesized or composite image. Note that the synthesized image to be outputted is not necessarily a so-called panoramic image and that the present invention is applicable to a normal image of arbitrary size serving as the synthesized image. Or the synthesized image to be outputted may be an image where a plurality of images having different resolutions are hierarchized. Such a hierarchized image may be constructed such that when a partial region of image is enlarged, the enlarged region is replaced by an image of a higher resolution.

What is claimed is:

1. An image generation apparatus comprising:
    a storage configured to store a plurality of low-dynamic-range (LDR) image sets each including a plurality of low-dynamic-range (LDR) segmented images of different pan angles or tilt angles, each LDR image set being of a different exposure level, respectively;
    a high-dynamic-range (HDR) synthesizing unit configured to combine a plurality of LDR segmented images of different exposure levels so as to generate a high-dynamic-range (HDR) segmented image set including a plurality of high-dynamic-range (HDR) segmented images of different pan angles or tilt angles; and
    an output image synthesizing unit configured to output an HDR output image by stitching together adjacent HDR segmented images of the high-dynamic-range (HDR) segmented image set.

2. An image generation apparatus according to claim 1, further comprising a detector configured to detect a control point associating adjacent HDR segmented images by extracting a feature point between adjacent HDR segmented images out of the plurality of HDR segmented images of different pan angles or tilt angles,
    wherein the output image synthesizing unit generates the HDR output image by adjusting alignment of and combining the adjacent HDR segmented images using the control point detected by the detector.

3. An image generation apparatus according to claim 1, further comprising a tone mapping unit configured to compress dynamic range of the plurality of HDR segmented images of different pan angles or tilt angles by tone mapping so as to generate a plurality of compressed dynamic range segmented images of different pan angles or tilt angles, wherein, when a low-dynamic-range (LDR) output image is to be generated, the output image synthesizing unit generates the LDR output image by stitching together adjacent segmented images out of the plurality of compressed dynamic range segmented images of different pan angles or tilt angles generated by the tone mapping unit.

4. An image generation apparatus according to claim 1, further comprising an image coding unit configured to compress and code, through motion compensation, an extended output image, when the output image is a moving image, wherein the extended output image is generated such that part of a region at a right end of the output image generated by the output image synthesizing unit is added to a left end thereof and such that part of a region at the left end thereof is added to the right end thereof.

5. An image display apparatus according to claim 1, wherein the output image is a panoramic image.

6. An image generation method comprising:

reading out, by a processor, a plurality of low-dynamic-range (LDR) image sets from a storage device for storing a plurality of LDR image sets each including a plurality of low-dynamic-range (LDR) segmented images of different pan angles or tilt angles, each LDR image set being of a different exposure level, respectively;

combining, by a processor, a plurality of LDR segmented images of different exposure levels so as to generate a high-dynamic-range (HDR) segmented image set including a plurality of HDR segmented images of different pan angles or tilt angles; and outputting, by a processor, an HDR output image by stitching together adjacent high dynamic range segmented images of the high-dynamic-range (HDR) segmented image set.

7. A non-transitory computer-readable medium encoded with a program, which is executable by a computer, the program comprising:

a reading module operative to read out a plurality of low-dynamic-range (LDR) image sets from a storage device for storing a plurality of LDR image sets each including a plurality of low-dynamic-range (LDR) segmented images of different pan angles or tilt angles, each LDR image set being of a different exposure level, respectively;

a high dynamic range synthesizing module operative to combine a plurality of LDR segmented images of different exposure levels so as to generate a high-dynamic-range (HDR) segmented image set including a plurality of high-dynamic-range (HDR) segmented images of different pan angles or tilt angles;

a tone mapping module operative to compress dynamic range of the plurality of HDR segmented images of different pan angles or tilt angles by tone mapping so as to generate a plurality of compressed dynamic range segmented images of different pan angles or tilt angles; and an output image synthesizing module operative to generate an HDR output image by stitching together adjacent HDR segmented images of the high-dynamic-range (HDR) segmented image set, when the HDR output image is to be generated, and operative to generate an LDR output image by stitching together adjacent segmented images out of the plurality of compressed dynamic range segmented images of different pan angles or tilt angles generated by the tone mapping, when the LDR output image is to be generated.

* * * * *